July 1, 1958 H. H. BOYLE 2,840,911
DENTAL PROSTHETIC APPLIANCES
Filed May 14, 1953 3 Sheets-Sheet 1

INVENTOR
Horace Hayman Boyle
BY
ATTORNEY

July 1, 1958     H. H. BOYLE     2,840,911
DENTAL PROSTHETIC APPLIANCES
Filed May 14, 1953     3 Sheets-Sheet 2

INVENTOR
Horace Hayman Boyle
BY *A. J. O'Dell*
ATTORNEY

July 1, 1958 H. H. BOYLE 2,840,911
DENTAL PROSTHETIC APPLIANCES
Filed May 14, 1953 3 Sheets-Sheet 3

INVENTOR
Horace Hayman Boyle
BY
ATTORNEY

United States Patent Office 2,840,911
Patented July 1, 1958

2,840,911

DENTAL PROSTHETIC APPLIANCES

Horace Hayman Boyle, Swansea, Wales

Application May 14, 1953, Serial No. 355,074

Claims priority, application Great Britain May 15, 1952

3 Claims. (Cl. 32—32)

It is now well known that the position of the teeth in a dental prosthesis cannot properly be determined with reference to any supposed movement of the lower jaw about the condyles, for the condyles do not govern the movements of mastication and so determine the occlusal surface, but on the contrary the occlusal surface governs the movements of mastication, and is itself of a form, in normal mouths, which permits of grinding action between the molars as well as of biting action between the incisors. By study of the shape of the occlusal surface in many individuals it has been possible to design a relatively small number of pairs of bite blocks in the form of stainless steel templates, one for the upper teeth and one for the lower, one or other of which will give a close approximation to the natural occlusal surface of any of ninety percent of dental patients.

The present invention is concerned with appliances designed to facilitate the correct positioning of such templates with reference to those parts of the denture which are shaped to fit the patient, and therefore with reference to the patient's jaws. For it is not enough that the occlusal surface shall be correct in form; it must also not be tilted sideways or backwards, nor must it be raised or lowered with respect to the position the natural occlusal surface occupies or once occupied in the case of a patient of normal conformation.

One usual procedure is to prepare plaster casts from moulds taken of the patient's mouth, to insert the upper mould faced with wax in the mouth, and attach to the wax the middle incisors. This determines the position of the middle of the incisal margin which is one point on the occlusal surface; it remains to determine and transfer to the workshop the proper position for the template which will determine the occlusal plane in the workshop.

For this purpose according to this invention a gauge plate is employed which can be fixed in the mould while the mould is in the patient's mouth, and be transferred with the mould to the laboratory. There it can be used by the aid of a housing or integrator which relates the gauge plate to an articulator, to position the mould correctly upon the articulator in relation to a template which is to guide the setting of the teeth.

Thus in the surgery the occlusion gauge plate serves to record on bite models in the mouth, (a) the median line of the head (b) the chosen edge level of the upper incisor teeth and (c) the mean level of the articulating plane of the teeth in closed centric occlusion.

In the laboratory the gauge can serve (a) to ensure correct articulation of the dental casts on a vertically adjustable articulator, (b) for setting up the two upper central incisor teeth to their pre-determined position, and (c) to gauge the placing of the calibrated template after the two upper incisor teeth have been placed in position. For these purposes the template must be properly positioned with respect to the articulator and this is the function of the integrator.

These appliances, and the method of making a dental prosthesis with precision to which they are ancillary, will be described with reference to the accompanying drawings. In these Figures 1, 2, and 3 are front elevation, plan and side elevation respectively of the integrator and articulator, with the gauge plate added in Figures 2 and 3.

Figure 2:
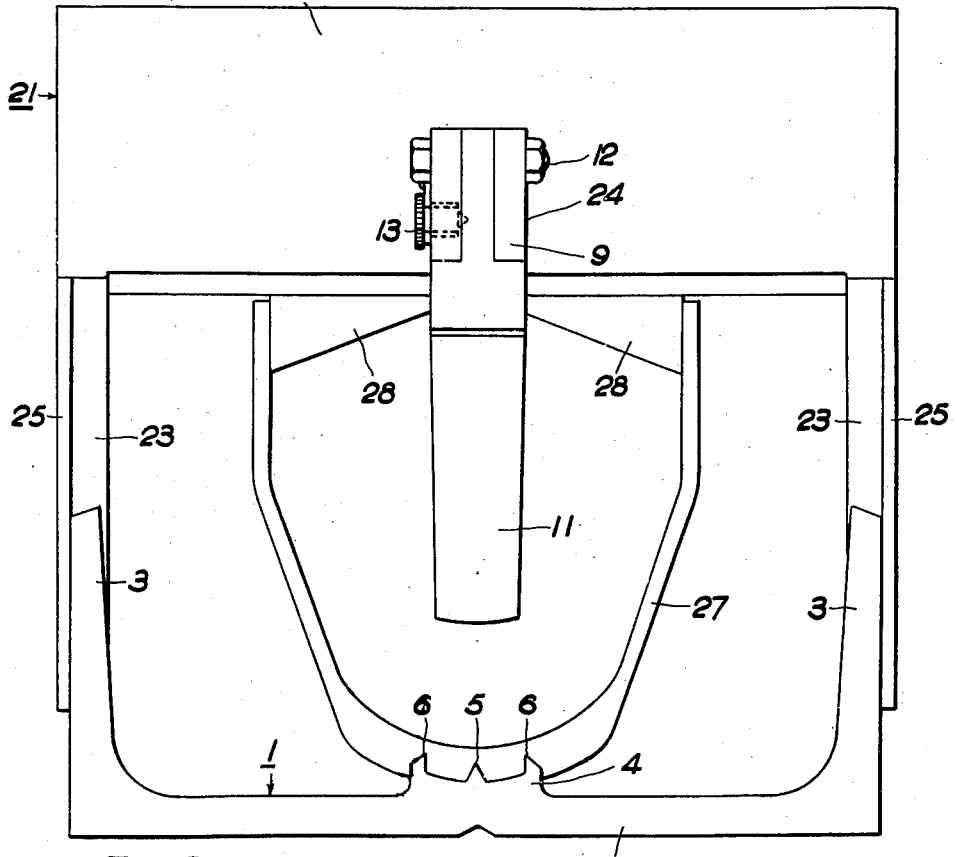
Figure 3:
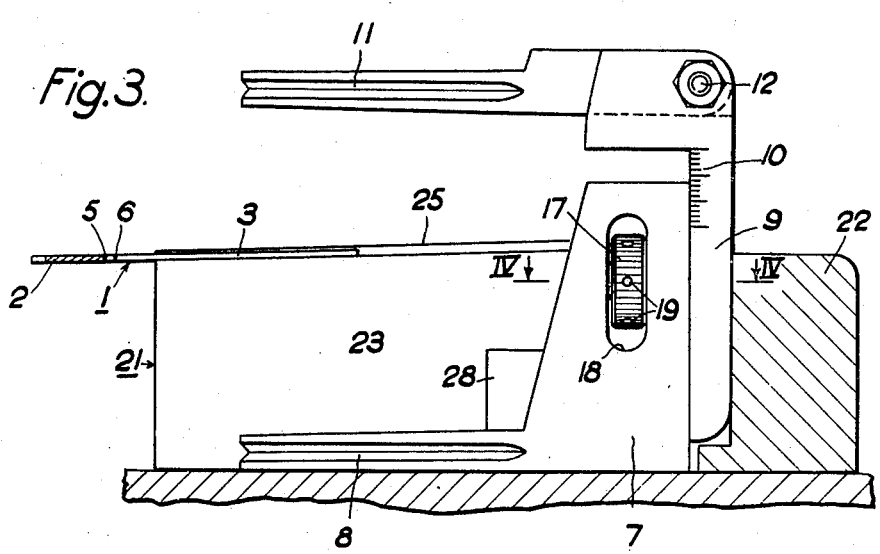
Figure 4:
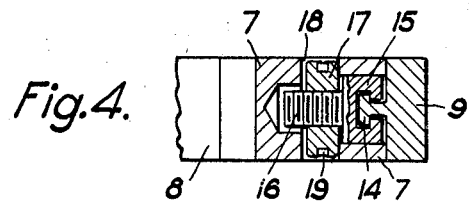
Figure 4 is a fragmentary section on the line IV—IV of Figure 3.

The gauge plate 1 seen in Figures 2 and 3 is a thin strip, preferably of stainless steel, comprising a laterally extending strip 2 of a length exceeding the normal width of the human head, and two rearward extensions 3 at the ends of the strip. From the middle of the strip 2 there projects forward a part 4 presenting a central point 5 and two points 6 on opposite sides of 5 spaced from it by the width of an incisor tooth.

Figure 1:
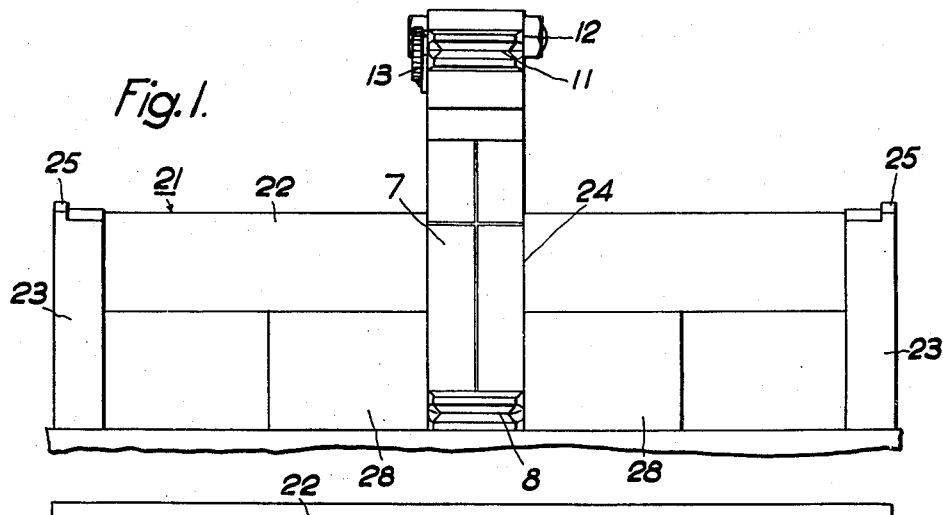
Figure 5:
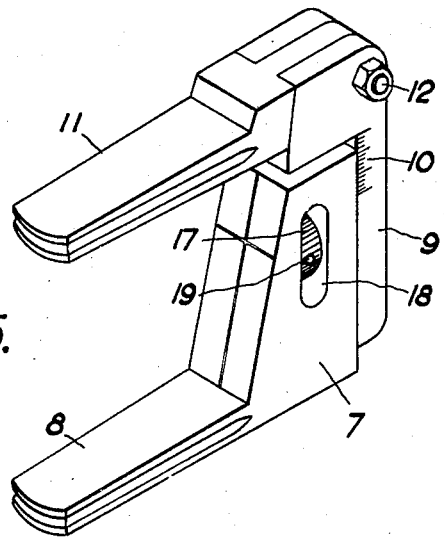
Figures 5 and 6 are isometric views of the articulator and integrator respectively, separated from each other.

The articulator which is shown separately in Figure 5 comprises a standard 7 from which a lower jaw mould holder 8 projects forward at the lower end, a carrier 9 which slides vertically in the standard 7 and an upper jaw mould holder 11 hinged at 12 to the carrier. This holder can be clamped in the position shown in Figure 5 by means of the knurl headed screw 13 (Figure 1). Both jaw mould holders 8 and 11 have a groove running around their periphery in order that they may the better key into plaster. The carrier 9 has a T shaped extension 14 sliding in a guide 15 within the standard 7. From the guide 15 there projects a threaded stud 16 upon which is a knurled nut 17 lodged in an opening 18 in the standard. The nut may also be provided with tommy bar openings 19. The carrier 9 and the standard 7 may have graduations and index marks as indicated at 10.

Figure 6:
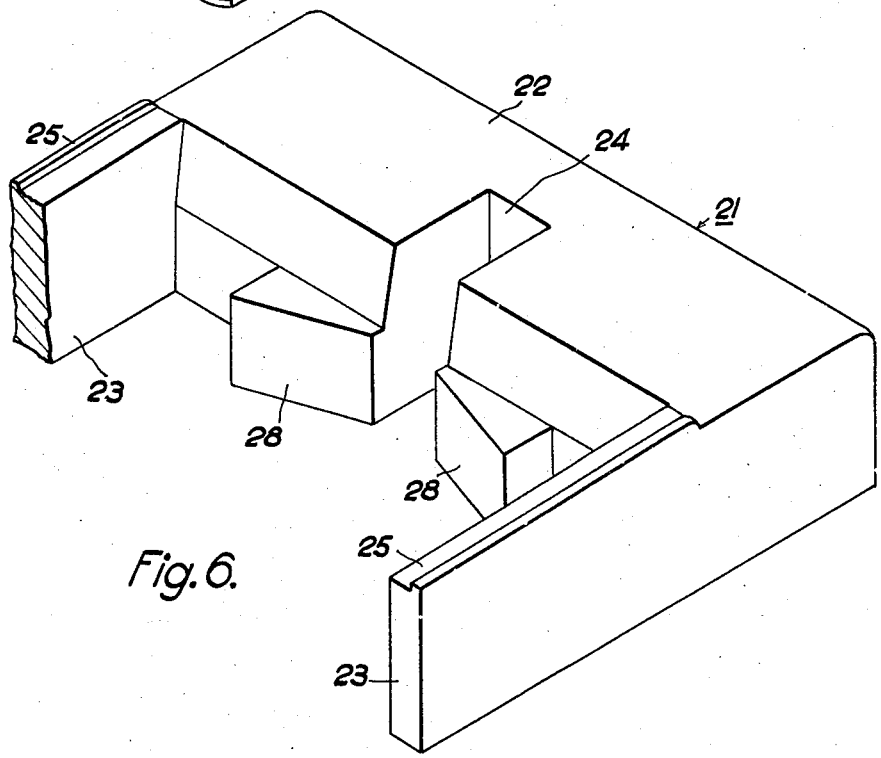

In order that the gauge plate 1 may be given a defined relation to the articulator there is provided the housing or integrator 21 in which both gauge plate and articulator fit. The integrator is essentially a block of substantially U form. As shown it has a massive straight back portion 22 from which project vertical parallel side walls 23. One of these is broken away in Figure 6. The back portion 22 and the gauge plate 1 appear in section in Figure 3 in order that the articulator may appear. In the back portion 22 there is a notch or recess 24 which fits the lower part of the standard 7 and accommodates the carrier 9 as may be seen from Figures 1 and 3. The side walls 23 are rabbeted on their upper surface so that there is an outer upstanding rib 25. These two ribs 25 are spaced apart by a distance equal to the width of the gauge plate 1 the limbs 3 of which fit between the ribs 25 and are guided by them as clearly appears from Figure 2.

In the surgery, as above explained, a mould faced with wax is placed in the patient's mouth, and according to the method of this invention a gauge plate 1 is attached to the mould by thrusting the points 5 and 6 into the wax. Naturally this is an operation not to be casually performed. The dental surgeon will be careful to see that the point 5 is centrally placed with respect to the patient, that the strip 2 is horizontal, and that the limbs 3 slope upward and rearward at the angle he judges to be appropriate to the patient. By its setting in the mould the gauge plate 1 records for the guidance of the dental mechanic the surgeon's observations and his instructions with reference to the setting of the teeth.

Mould and gauge plate go together to the laboratory. An articulator is placed in the integrator, and the gauge plate is laid upon the upper surface of the integrator between the ribs 25. The upper mould holder carrier 9' is adjusted to suit the position of the mould, and the mould is then affixed to the jaw mould holder 11 by means of plaster which keys into the groove in the periphery of the mould holder. In the atachment of a lower jaw mould to the holder 8 it is convenient to employ the horseshoe strip 27, seen in Figure 2, as a form of shuttering to confine the plaster. This strip may be made to fit projection 28 on the rear portion 22 of the integrator, so that it is centrally located.

The plaster case will have to remain attached to the articulator for some days, though the mechanic will be working on it for only a fraction of that time. But the articulator can be removed from the integrator, setting the later free for further use, and can be replaced with precision when desired.

Figure 7:
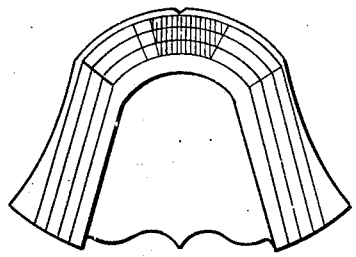
Figure 7 shows a template of known form.

In the setting of the upper teeth a template of the kind shown in Figure 7 is set upon wax at the level of the gauge plate, and the teeth are set with their occlusal surfaces on the template.

Though the dental surgeon has determined the slope of the gauge plate in the surgery, it will generally be convenient to make the surfaces of the walls 23 slant upward slightly from front to back.

In the example considered the cast of the lower jaw will be positioned with respect to the cast of the upper jaw arrived at as just indicated. This will involve building up the cast by a mass of plaster placed on the base plate of the housing beneath it and similarly keying into a groove on the carrier. It is convenient to provide a horseshoe of sheet metal set on edge by way of shuttering for the casting of this additional plaster. Deep grooves may be made in the rear wall of the integrating unit to receive the ends of this shuttering.

I claim:

1. A gauge plate for defining on a mould for dental prosthesis the position of a patient's occlusal surface, comprising a strip of metal of a length exceeding the normal width of a human head, having substantially parallel rearward extensions at its ends, said strip having also a rearwardly projecting center point and two other rearwardly projecting points spaced on opposite sides of the centre point by the normal width of an incisor.

2. Apparatus for positioning teeth upon a dental prosthesis comprising a housing of U form having a recess to receive and fit an articulator, and a surface with guides at mid height of said articulator to receive and fit a gauge plate, an articulator lodged in said recess in said housing and thereby definitely located with respect to said surface and having upper and lower jaw mould carriers, and a gauge plate resting on said surface of the housing and laterally located by the guides thereof.

3. Apparatus for positioning teeth upon a dental prosthesis comprising an integrating unit having parallel side walls, with guides projecting upward from their upper surface and a rear wall at right angles to and joining the side walls, said rear wall having a recess at its middle, an articulator comprising a standard lodged in and fitting in said recess, a carrier sliding vertically in the standard, a lower jaw mould holder projecting from the lower end of the standard, an upper jaw mould holder projecting from the upper end of said carrier and means for clamping said carrier in adjusted position, and a gauge plate resting on said upper surface of the integrating unit side walls and fitting between said guides.

References Cited in the file of this patent
UNITED STATES PATENTS

| | | |
|---|---|---|
| 629,531 | Snow | July 25, 1899 |
| 1,703,105 | Hawksworth | Feb. 26, 1929 |
| 2,648,130 | Avery | Aug. 11, 1953 |